United States Patent
Kuragaki et al.

(10) Patent No.: US 6,311,121 B1
(45) Date of Patent: Oct. 30, 2001

(54) VEHICLE RUNNING CONTROL APPARATUS, VEHICLE RUNNING CONTROL METHOD, AND COMPUTER PROGRAM PRODUCT HAVING THE METHOD STORED THEREIN

(75) Inventors: Satoru Kuragaki; Mitsuo Kayano, both of Hitachi; Toshimichi Minowa, Mito; Hiroshi Kuroda, Hitachi; Yoshinori Endo, Mito; Kozo Nakamura, Hitachiota; Kazuaki Takano, Mito, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/231,661

(22) Filed: Jan. 15, 1999

(30) Foreign Application Priority Data

Jan. 19, 1998 (JP) .................................................. 10-007262

(51) Int. Cl.[7] .............................. G06F 7/00; B60T 7/12; G05D 1/00
(52) U.S. Cl. .............................. 701/96; 701/93; 180/167; 180/170; 340/903; 340/901; 342/70
(58) Field of Search .............................. 701/96, 93, 97, 701/300, 301; 180/168, 169; 340/903, 904, 435, 436, 942, 438; 123/352; 342/70, 72, 73, 82, 111, 116, 104, 115, 159; 348/118, 148; 356/497, 358

(56) References Cited

U.S. PATENT DOCUMENTS

| | | | |
|---|---|---|---|
| 4,621,705 | * 11/1986 | Etoh ....................................... 180/169 |
| 4,628,317 | * 12/1986 | Nishikawa et al. ................... 340/903 |
| 4,694,296 | * 9/1987 | Sasaki et al. ......................... 340/903 |
| 4,703,429 | * 10/1987 | Sakata ..................................... 701/96 |
| 4,716,298 | * 12/1987 | Etoh ..................................... 250/561 |
| 4,757,450 | * 7/1988 | Etoh ....................................... 701/96 |
| 4,786,164 | * 11/1988 | Kawata ................................. 180/168 |
| 5,579,012 | * 11/1996 | Iwakuni et al. ....................... 342/117 |
| 5,587,908 | * 12/1996 | Kajiwara ................................. 701/96 |
| 5,627,511 | * 5/1997 | Takagi et al. ........................ 340/435 |
| 5,642,194 | * 6/1997 | Erskine ................................. 356/345 |
| 5,660,157 | 8/1997 | Minowa et al. ..................... 123/416 |
| 5,675,518 | * 10/1997 | Kuroda et al. .......................... 701/96 |
| 5,835,203 | * 11/1998 | Ogura et al. ........................ 356/5.01 |
| 5,910,786 | * 6/1999 | Watanabe ............................... 342/70 |
| 5,910,839 | * 6/1999 | Erskine ................................. 356/345 |
| 5,959,570 | * 9/1999 | Russell ................................... 342/70 |
| 6,009,368 | * 12/1999 | Labuhn et al. ......................... 701/96 |
| 6,037,895 | * 3/2000 | Uehara ................................... 342/70 |

FOREIGN PATENT DOCUMENTS

| | | |
|---|---|---|
| A-7-76237 | 3/1995 | (JP) . |
| A-8-166444 | 6/1996 | (JP) . |
| A-9-323628 | 12/1997 | (JP) . |
| A-10-76867 | 3/1998 | (JP) . |

OTHER PUBLICATIONS

"An Adaptive Cruise System Using A Millimeter Wave Radar", Intelligent Vehicle '98, Oct. 1998, pp. 1–7.

* cited by examiner

Primary Examiner—Jacques H. Louis-Jacques
(74) Attorney, Agent, or Firm—Crowell & Moring LLP

(57) ABSTRACT

In a vehicle running control apparatus and method, the change of a difference in frequency between an electromagnetic wave signal transmitted from a vehicle and an electromagnetic wave signal reflected from an object is detected. Information inclusive of a distance between the object and the vehicle and a relative speed of one of the object and the vehicle to the other is generated on the basis of the change in frequency difference. A desired speed is generated on the basis of the generated information and information of the running of the vehicle so that the change in frequency difference is generated. A signal for control of the speed of the vehicle is generated on the basis of the desired speed.

27 Claims, 14 Drawing Sheets

FIG. 1
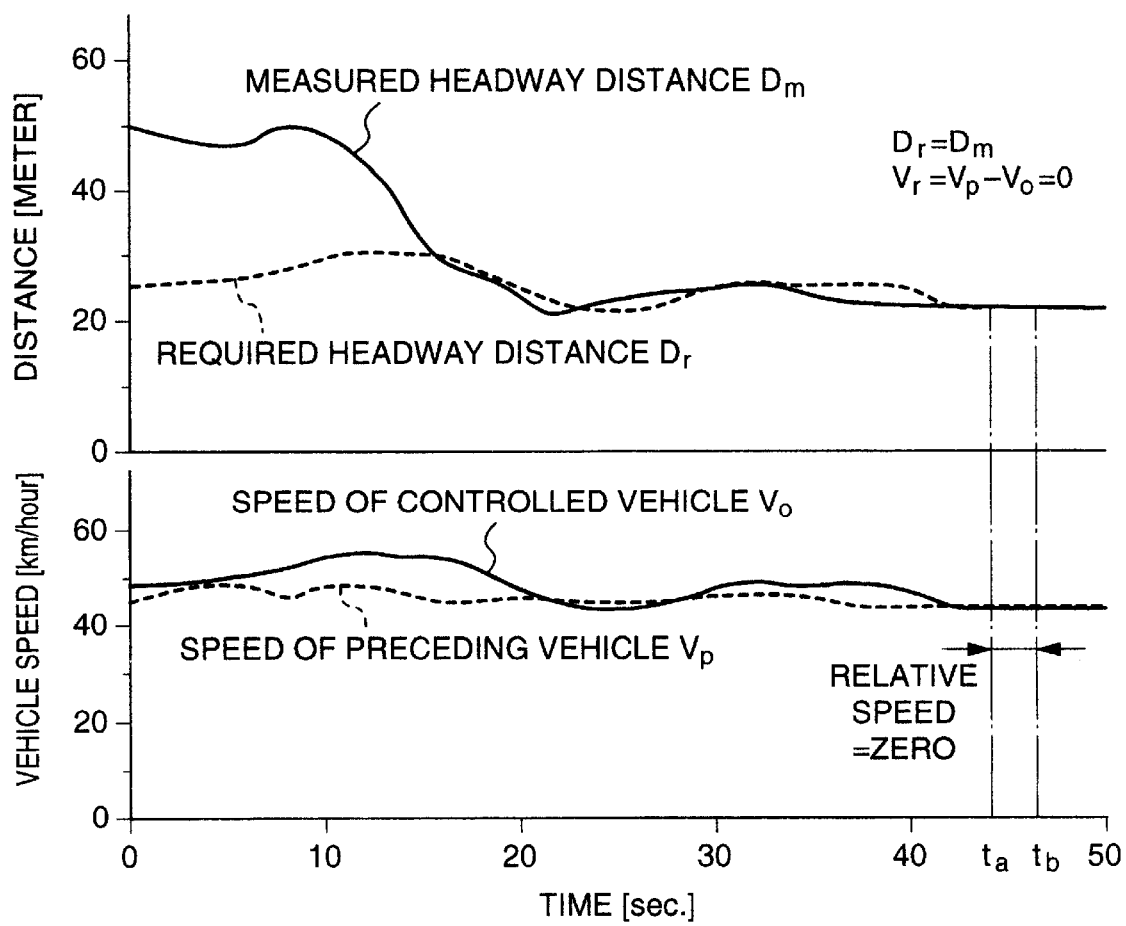
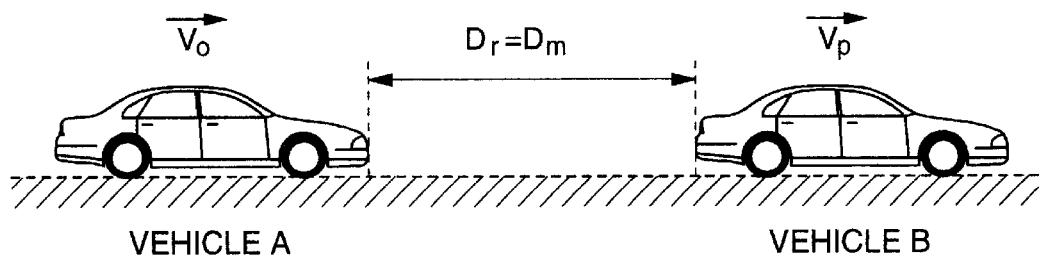
VEHICLE A                    VEHICLE B

VEHICLE RUNNING CONTROL APPARATUS, VEHICLE RUNNING CONTROL METHOD, AND COMPUTER PROGRAM PRODUCT HAVING THE METHOD STORED THEREIN

BACKGROUND OF THE INVENTION

The present invention relates to a vehicle running control apparatus, and more particularly to a vehicle running control apparatus and method in which a vehicle to be controlled is caused to run with a transmission mechanism, a throttle mechanism and a brake mechanism controlled so that a distance between the vehicle to be controlled and an object such as a preceding vehicle existing in front of the vehicle to be controlled is matched with a desired distance.

In recent years, there have been developed a vehicle running control apparatus provided with a vehicle speed control function (or cruise control function) of performing the running of a vehicle to be controlled with a vehicle speed kept constant as well as a headway distance control function (or adaptive cruise control function) of performing the running of the vehicle with a safe headway distance kept between the vehicle and a preceding vehicle by use of a radar system which is mounted on the vehicle to be controlled and detects a headway distance to the preceding vehicle. As has been disclosed by, for example, JP-A-7-76237, a follow-up running for a preceding vehicle is performed by controlling a vehicle speed so that a headway distance detected by a radar sensor keeps a safe headway distance corresponding to the vehicle speed. In the case where there is no preceding vehicle within the safe headway distance, an acceleration running is performed up to a preset desired speed (or target speed command) and a keep-speed running is thereafter performed in accordance with the desired speed. Also, there is an apparatus in which when a host vehicle to be controlled is running on a curved road and a preceding vehicle having been able to be measured by a radar system moves out of a measurable range so that the measurement becomes impossible, the speed of the preceding vehicle is estimated and the speed of the host vehicle is controlled by use of the estimated speed.

JP-A-9-323628 corresponding to the U.S. patent application Ser. No. 08/871,887 filed on Jun. 9, 1997 has disclosed an apparatus in which a vehicle speed control is performed while maintaining a headway distance to a preceding vehicle at a required value. JP-A-10-76867 corresponding to the U.S. patent application Ser. No. 08/923,414 filed on Sep. 4, 1997 has disclosed a running control system in which a running control map corresponding to the running condition of a vehicle provided with an automatic cruising device is prepared so that an area of the running control map is selected in accordance with a relative speed and headway distance to a preceding vehicle.

The radar systems used in the above-mentioned apparatuses include three typical systems as enumerated in the following. The first system is a laser radar. The principle of the laser radar will now be described in brief. A short pulse-like laser beam is periodically transmitted (or emitted) from a laser diode, and a laser beam reflected by a reflecting plate such as a reflector mounted at the rear of a vehicle is received by a photodiode. A distance to the reflecting plate is measured from the product of a time from the transmission to the reception and the light velocity. Since an object having the reflecting plate mounted thereon is detected, it is easy to detect, for example, a motor vehicle or an auto-bicycle. On the other hand, under a condition in which the visibility with the naked eyes is unavailable owing to, for example, rain, fog or the like, a detectable distance becomes remarkably short as compared with that at the time of fine weather. This is because there is used a laser beam which is easy to handle and has a wavelength close to visible light. Also, since the principle of measurement is based on the measurement of a time from transmission to reception, what can directly be detected is only a distance.

The second system is a frequency modulated continuous wave (FMCW) radar. An electromagnetic wave or a radio wave signal having a continuously changing frequency are transmitted and an electromagnetic wave signal reflected from an object (or receive wave) are received. The transmit wave and the receive wave are mixed to obtain a signal which has a frequency corresponding to a distance to the object reflecting the transmit wave and a signal which has a frequency corresponding to a relative speed. Thereby, it is possible to detect the distance and the relative speed directly. For example, provided that the center frequency of the transmit wave is 60 GHz, a modulation band is 75 MHz and a frequency for causing a frequency change is 750 Hz, a distance detection range of the radar is 150 m and the resolution of the relative speed is 3.75 m/s. The wavelength is long as compared with that in the laser radar and an object existing in the front can be detected even under a condition in which the visibility with the naked eyes is unavailable.

The third system is a two-frequency continuous wave (or two-frequency CW) radar. Two different frequencies $f_1$ and $f_2$ are transmitted in a time-shared switching manner so that a relative speed and a distance to an object are detected from a Doppler frequency or a frequency change which is included in waves reflected from the object (or receive waves). For example, provided that a first frequency of the transmit waves is 60 GHz and a second frequency thereof is 60 GHz+250 kHz, a distance detection range of the radar is 150 m. Similarly to the FMCW system, the wavelength is long as compared with that in the laser radar and an object existing in the front can be detected even under a condition in which the visibility with the naked eyes is unavailable. Also, there is a feature that the resolution and accuracy of the relative speed are better or equal to or smaller than 0.3 m/s. However, since the frequency change caused by the Doppler effect is used as the principle of measurement, it is not possible to detect an object when the relative speed is zero.

JP-A-8-166444 has disclosed a distance measurement equipment based on the two-frequency CW system.

SUMMARY OF THE INVENTION

FIG. 1 shows an example of a headway distance control. In the case where there is a difference between a required (or target) headway distance $D_r$ and a measured headway distance $D_m$ at time 0, a vehicle A to be controlled is accelerated to increase a vehicle speed $V_o$, thereby making the deviation of $D_m$ from $D_r$ small and the vehicle A is thereafter decelerated so that $V_o$ becomes approximately equal to the speed $V_p$ of a preceding vehicle B. Shortly or at time $t_a$, $D_r$ and $V_o$ come to the same as $D_m$ and $V_p$, respectively, so that the vehicle A runs with a headway distance to the preceding vehicle B kept at the required distance $D_r$. Namely, the headway distance control eliminates the deviation of the measured distance $D_m$ between the vehicle A and the preceding vehicle B from the required distance $D_r$ therebetween and makes a relative speed $V_r$ of zero.

In the case where the headway distance control is performed by use of the two-frequency CW system selected from among the three radar systems in light of the ability of detection of an object in the front even at the time of unavailable visibility with the naked eyes and the better resolution and accuracy of the relative speed, there is the following problem. When a relative speed is zero, the two-frequency CW radar is disabled to detect a headway distance to a preceding vehicle and the relative speed since a frequency shift caused by the Doppler effect is not generated, as mentioned above. Namely, when the headway distance control is best operated, the two-frequency CW radar is disabled to detect the preceding vehicle.

The present invention provides a technique of controlling the running of a vehicle to maintain a required headway distance and a desired relative speed so that the relative speed of the vehicle to an object does not come to zero.

In a vehicle running control technique according to the present invention, the change of a difference in frequency between an electromagnetic wave signal transmitted from a vehicle and an electromagnetic wave signal reflected from an object is detected. Information concerning the running of the vehicle and including a distance between the vehicle and the object and the relative speed of the vehicle to the object is generated on the basis of the detected frequency difference change. A desired speed (or speed command) for generating a change in frequency difference is generated on the basis of the running information so that the speed of the vehicle is controlled on the basis of the desired speed.

According to the present invention, the relative speed of a vehicle to an object does not come to zero even when the running of the vehicle is being controlled so that a required headway distance and a desired relative speed are maintained. Therefore, it is possible to detect the object always by use of the Doppler effect included in a reflected electromagnetic wave signal.

According to an embodiment of the present invention, a desired speed for correction setting unit is provided for causing a difference between the speed of a vehicle to be controlled and the speed of a preceding vehicle always so that a relative speed does not come to zero. When the absolute value of the relative speed becomes equal to or smaller than a predetermined value, the desired speed for correction setting unit generates a desired speed for correction (correction speed command) and adds it to an ordinary desired speed so that the vehicle to be controlled is caused to run with the value of addition taken as a new desired speed. In this case, the desired speed for correction is generated with a smooth signal having a low frequency in order that acceleration or deceleration caused by the desired speed for correction is not felt by a driver. The desired speed for correction may be generated with either a signal having a single frequency or a signal having a plurality of frequencies superimposed. Also, parameters used for generation of the desired speed for correction may be either a relative speed or the deviation of a measured distance from a required distance.

According to another embodiment of the present invention, a required distance for correction setting unit is provided for causing a difference between the speed of a vehicle to be controlled and the speed of a preceding vehicle always so that a relative speed does not come to zero. When the absolute value of the relative speed becomes equal to or smaller than a predetermined value, the required distance for correction setting unit generates a required distance for correction (correction target distance) and adds it to an ordinary required distance so that the vehicle to be controlled is caused to run with the value of addition taken as a new required distance. Similarly to the first embodiment, the required distance for correction may be generated with a signal having a single frequency or a plurality of frequencies superimposed in order that acceleration or deceleration caused by the required distance for correction is not felt by a driver. Also, parameters used for generation of the required distance for correction may be either a relative speed or the deviation of a measured distance from a required distance.

BRIEF DESCRIPTION OF THE DRAWINGS

FIG. 1 is a diagram for explaining a headway distance control;

DESCRIPTION OF THE PREFERRED EMBODIMENTS

Figure 2:
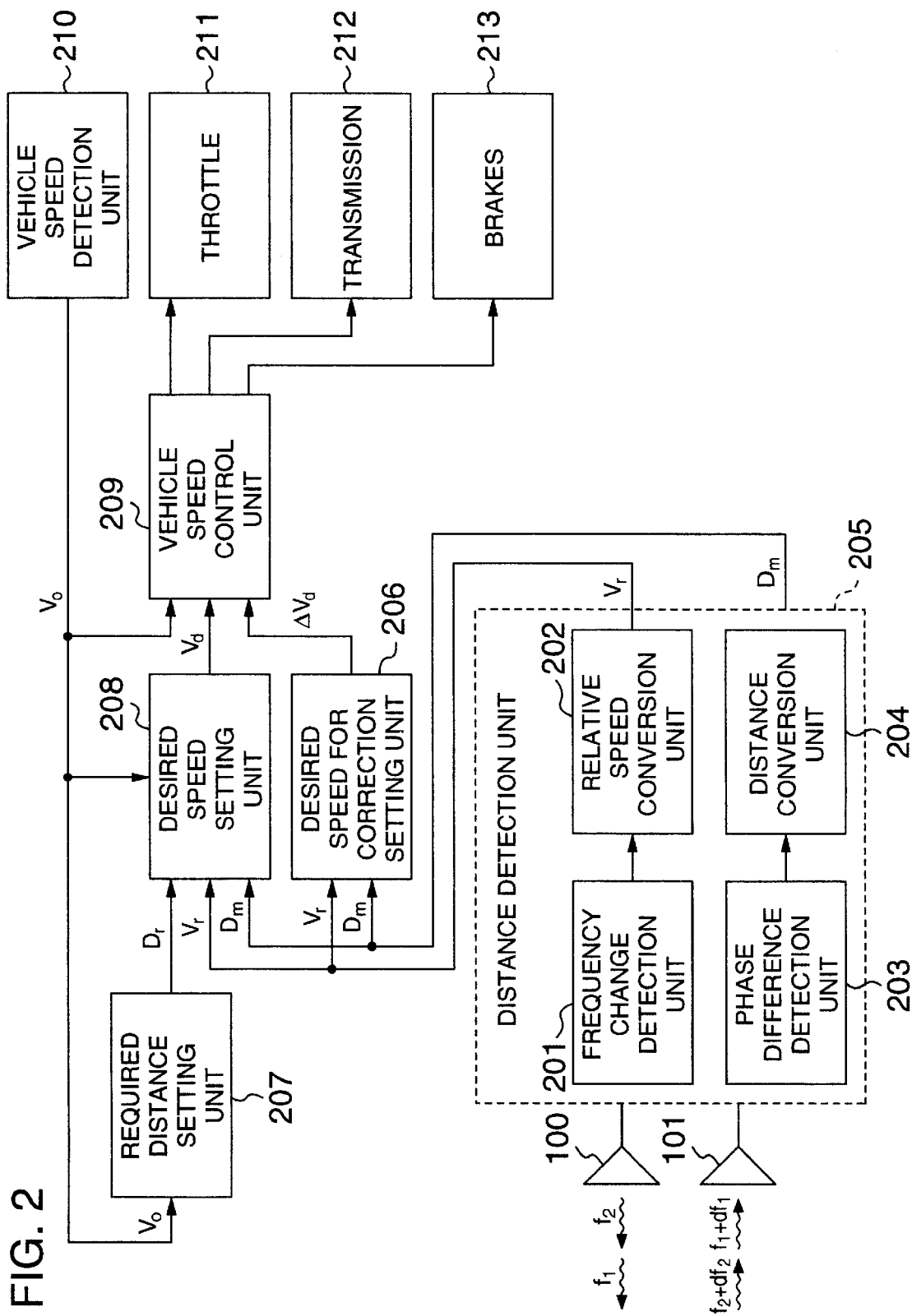
FIG. 2 is a block diagram of a first embodiment of a vehicle running control apparatus according to the present invention.

FIG. 2 is a block diagram of a first embodiment of a vehicle running control apparatus according to the present invention. Two electromagnetic wave signals including different frequencies $f_1$ and $f_2$ in a millimeter wave band are transmitted by a transmitter 100 inclusive of an antenna toward a preceding vehicle B from a vehicle A to be controlled. The reflected electromagnetic wave signals from the preceding vehicle B are received by a receiver 101 inclusive of an antenna. The reflected waves being subjected the Doppler effect corresponding to a difference in speed between the vehicles A and B are received as frequencies $f_1+df_1$ and $f_2+df_2$ different from the frequencies of the transmit waves. On the basis of the frequencies and phases of the transmit and receive waves, a distance detection unit 205 including a frequency change detection unit 201, a relative speed conversion unit 202, a phase difference detection unit 203 and a distance conversion unit 204 detects a measured headway distance $D_m$ and a measured relative speed $V_r$. The detection of the headway distance $D_m$ and the relative speed $V_r$ in the distance detection unit 205 can be realized using that technique for measurement of a headway distance and a relative speed based on a two-frequency CW system which has been disclosed by an article written by authors including a part of the present inventors and entitled "An Adaptive Cruise Control System Using A Millimeter Wave Radar", Intelligent Vehicle '98, October 1998. The disclosure of this article is incorporated herein by reference. Also, a required distance setting unit 207 sets a required (or target) headway distance $D_r$ on the basis of a vehicle speed $V_o$ detected by a vehicle speed detection unit 210. A desired speed setting unit 208 sets a desired speed (or speed command) $V_d$ on the basis of the required distance $D_r$, the measured distance $D_m$ and the measured relative speed $V_r$. A desired speed for correction setting unit 206 generates a desired speed for correction (or correction speed command) $\Delta V_d$ on the basis of the measured distance $D_m$ and the measured relative speed $V_r$. A vehicle speed control unit 209 determines a required throttle opening angle (or throttle opening angle command), a required speed change (or speed change command) and a required brake (or brake command) from the vehicle speed $V_o$, the desired speed $V_d$ and the desired speed for correction $\Delta V_d$ to drive a throttle 211, a transmission 212 and brakes 213.

The functions of all or a part of the blocks or units 205, 206, 207, 208 and 209 shown in FIG. 2 can be realized by a microcomputer (not shown) mounted on the vehicle. The microcomputer is commercially available and includes a CPU, a memory capable of storing control programs and control data, an interface for input/output of signal for the exterior, and a bus for connecting these components. A procedure for a vehicle running control according to the present invention is described in the form of computer readable code data and is stored into a recording medium. The recording medium may be, for example, a semiconductor memory, a magnetic disk, an optical disk, or another type of information recording medium having a computer readable structure.

Figure 3:
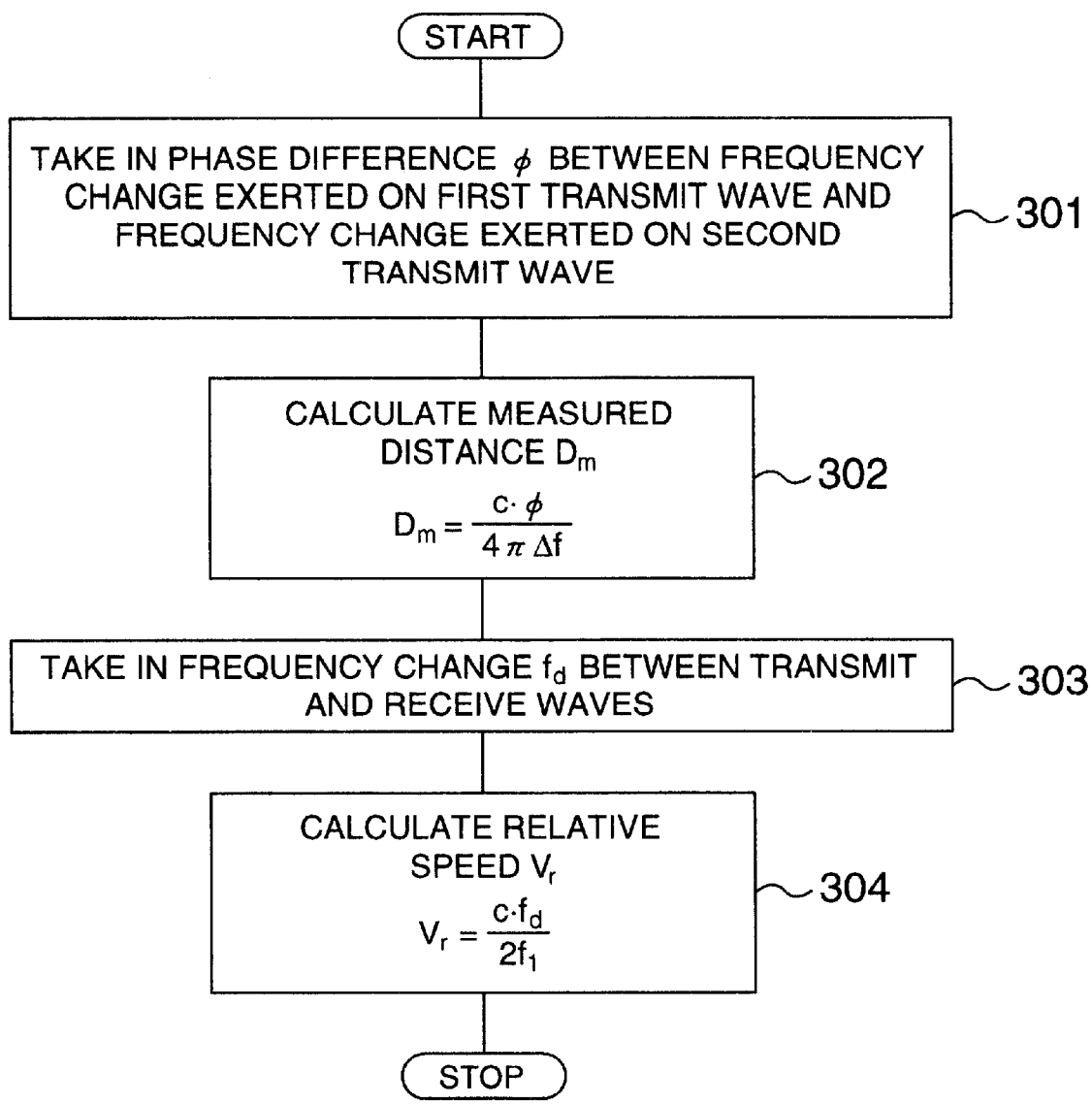
FIG. 3 is a flow chart showing a processing performed by a relative speed conversion unit and a distance conversion unit shown in FIG. 2.

The relative speed conversion unit 202 and the distance conversion unit 204 performs a processing for detection of a distance and a relative speed in accordance with a flow shown in FIG. 3. In step 301, a phase difference $\phi$ between frequency changes caused by the Doppler effect exerted on the two transmit waves $f_1$ and $f_2$ is taken in. The phase difference $\phi$ is detected by the phase detection unit 203. In step 302, a measured distance $D_m$ is determined from the phase difference $\phi$ by use of equation (1):

$$D_m = c \cdot \phi / 4\pi \Delta f \quad (1)$$

where c is the light velocity ($3 \times 10^8$ m/s) and $\Delta f$ is a phase difference between the two transmitted frequencies $f_1$ and $f_2$ (for example, 250 kHz). In step 303, a frequency change $f_d$ (or a difference in frequency between the transmit and receive waves) detected by the frequency change detection unit 201 is taken in. In step 304, a relative speed $V_r$ is determined from the frequency change $f_d$ by use of equation (2):

$$V_r = c \cdot f_d / 2 \cdot f_1 \quad (2)$$

where c is the light velocity and $f_1$ is the frequency of one of the two transmit waves (for example, 60 GHz).

Figure 4:
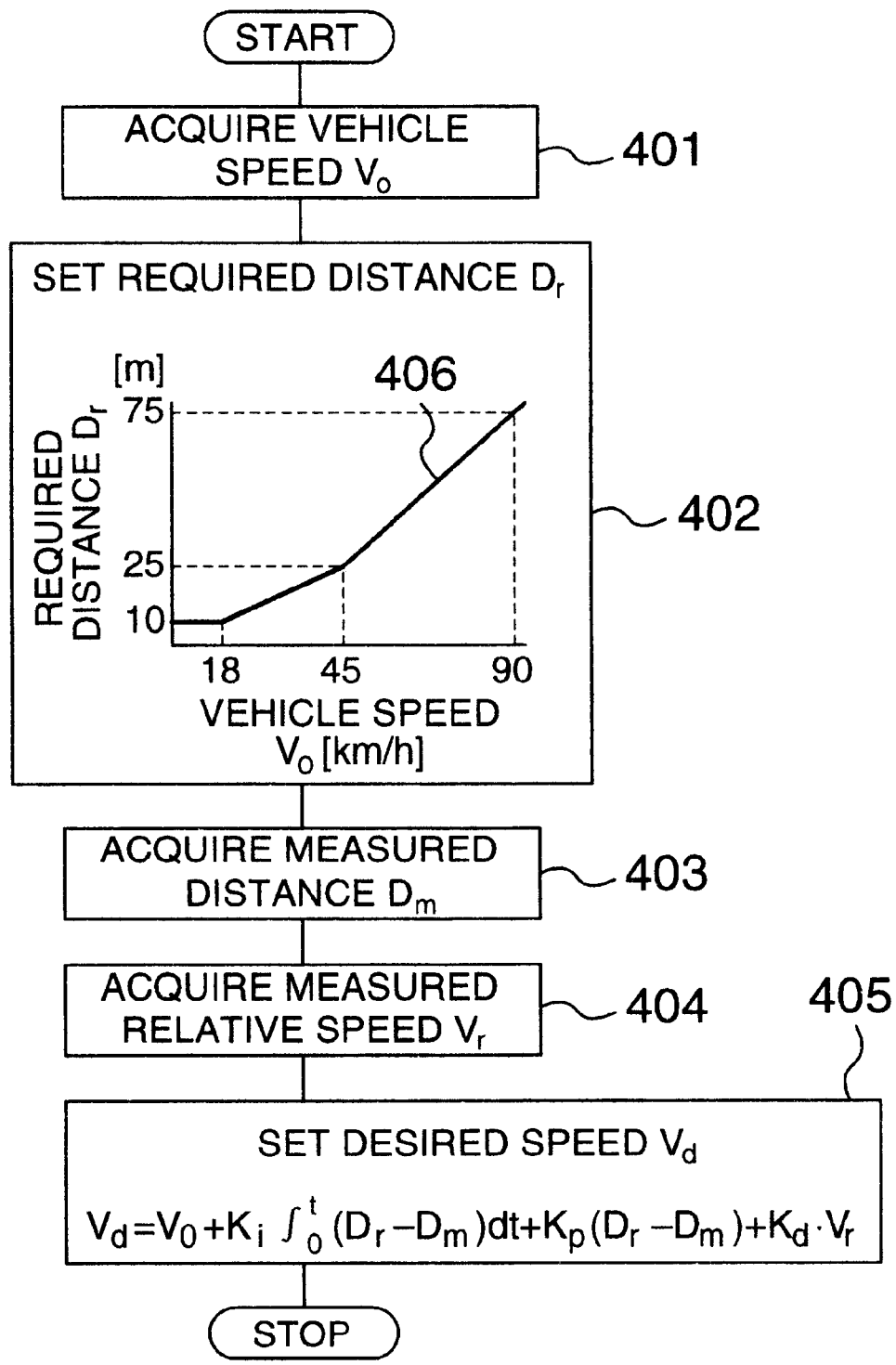
FIG. 4 is a flow chart showing a required distance setting unit and a desired speed setting unit shown in FIG. 2.

The required distance setting unit 207 and the desired speed setting unit 208 performs a processing for determination of a desired speed $V_d$ in accordance with a flow shown in FIG. 4. In step 401, a vehicle speed $V_o$ is taken in from the vehicle speed detection unit 210. In step 402, a required distance $D_r$ corresponding to the vehicle speed $V_o$ is set on the basis of characteristic data 406 stored in a memory. When the vehicle speed $V_o$ is lower than 18 km/h, the required distance $D_r$ is set to 10 m. In a period of time when the vehicle speed $V_o$ is in a range from 18 km/h to 45 km/h, the required distance $D_r$ is set to a value longer than 10 m in proportion to the vehicle speed so that it comes to 25 m when the vehicle speed $V_o$ is 45 km/h. Further, when the vehicle speed $V_o$ is higher than 45 km/h, the required distance $D_r$ is set to a longer value in proportion to the vehicle speed so that it comes to 75 m when the vehicle speed $V_o$ is 90 km/h. However, it should be understood that the present invention is not limited to the characteristic 406. In step 403, the measured distance $D_m$ obtained by the distance detection unit 205 in step 302 is taken in. In step 404, the measured relative speed $V_r$ obtained in step 304 is taken in. In step 405, a desired speed $V_d$ is determined from the required distance $D_r$, the measured distance $D_m$, the measured relative speed $V_r$ and the vehicle speed $V_o$ in accordance with equation (3):

$$V_d = V_o + K_i \int_o^t (D_r - D_m) dt + K_p (D_r - D_m) + K_d \cdot V_r \quad (3)$$

Equation (3) represents a PID control in which the required distance $D_r$ is taken as a required (or target) input, the measured distance $D_m$ and the vehicle speed $V_o$ are taken as variable parameters, and the desired speed $V_d$ is taken as a control output. In equation (3), $K_i$, $K_p$ and $K_d$ representing the gains of a PID control system are values experimentally determined beforehand and t is the time.

Figure 5:
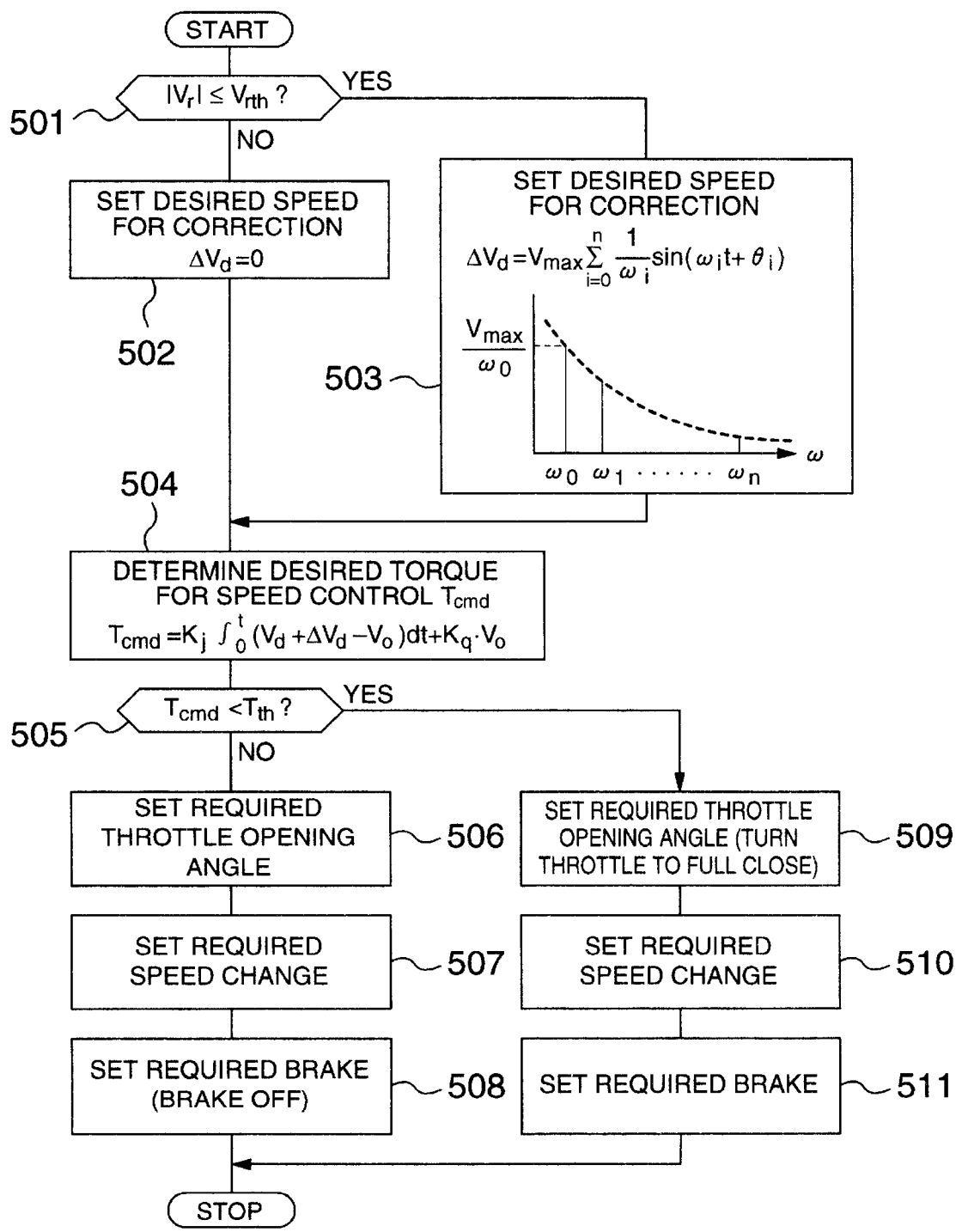
FIG. 5 is a flow chart showing that processing for speed control based on a relative speed which is performed by a desired speed for correction setting unit and a vehicle speed control unit shown in FIG. 2.

The desired speed for correction setting unit 206 and the vehicle speed control unit 209 performs a processing for vehicle speed control in accordance with a flow shown in FIG. 5. In step 501, the absolute value of the measured relative speed $V_r$ is compared with a preset threshold relative speed $V_{rth}$. In the case where $|V_r| > V_{rth}$, a desired speed for connection $\Delta V_d$ is set to zero (step 502). In this case of $|V_r| > V_{rth}$, it is meant that there is a difference in speed between the preceding vehicle B and the vehicle A to be controlled and a difference between the required distance $D_r$ and the measured distance $D_m$ is decreasing or will increase from now on. In any case, it is necessary to make the vehicle speed $V_o$ higher or lower than the speed $V_p$ of the preceding vehicle so that the measured distance $D_m$ is matched with the required distance $D_r$. Therefore, the relative speed does not come to zero even if a speed correction is not performed. Accordingly, it is possible to detect a relationship between the preceding vehicle and the vehicle to be controlled.

On the other hand, in the case where $|V_r| \leq V_{rth}$, a desired speed for correction $\Delta V_d$ is set in step 503 in accordance with equation (4):

$$\Delta V_d = V_{max} \sum_{i=0}^{n} \frac{1}{\omega_i} \sin(\omega_i t + \theta_i) \quad (4)$$

where $V_{max}$ is the maximum speed for correction, $\omega_i$ is the angular frequency, t is a time from the setting of the desired speed for correction, $\theta_i$ is an initial phase difference, and n is any integer equal to or larger than 0.

In this case of $|V_r| \leq V_{rth}$, a difference between the preceding vehicle and the vehicle to be controlled is small and the vehicle distance control based on equation (3) results in that the measured distance $D_m$ substantially matches with the required distance $D_r$. Accordingly, so long as the preceding vehicle does not make a speed change, there results in that the speed $V_o$ of the vehicle to be controlled matches with the speed $V_p$ of the preceding vehicle so that the relative speed $V_r$ comes to zero. When the relative speed $V_r$ comes to zero, the detection of the preceding vehicle by the distance detection unit 205 becomes impossible if the desired speed for correction $\Delta V_d$ is not set additionally. The desired speed for correction $\Delta V_d$ is set with a sine wave signal having a low frequency (for example, equal to or lower than 1 Hz) in order that a different feeling is not given to the driver. In the case where the state of $|V_r| \leq V_{rth}$ continues over a long time, the driver has the different feeling if a single frequency is used. In this case, it is preferable to superimpose plural or n sine wave signals ($n \geq 2$) having different frequencies as shown in the block of step 503 in FIG. 5.

In step 504, a desired torque for speed control (or speed control target torque) $T_d$ is determined in accordance with equation (5):

$$T_d = K_j \int_o^t (V_d + \Delta V_d - V_o) dt + K_q \cdot V_o \quad (5)$$

Equation (5) represents a PI control in which the sum of the desired speed $V_d$ determined in step 405 and the desired speed for correction $\Delta V_d$ determined in step 502 or 503 is taken as a desired (or target) input, the vehicle speed $V_o$ is taken as a variable parameter, and the desired driving torque $T_d$ is taken as a control output. In equation (5), $K_j$ and $K_q$ are preset control constants (for example, $K_j$=93 and $K_q$=365). In step 505, the desired torque for speed control $T_d$ is compared with a preset desired torque threshold $T_{th}$. Though the value of the threshold $T_{th}$ may change in accordance with the running resistances of the vehicle (including a resistance resulting from the gradient of a road surface, a frictional resistance, an air resistance, and so forth), it is set to about zero under a normal running condition. $T_{th}$ is a threshold for making the selection of whether a required throttle opening angle or a required brake should be taken as a main control parameter for vehicle speed control. In the case where $T_d \geq T_{th}$, steps 506 to 508 are carried out. In the case where $T_d < T_{th}$, steps 509 to 511 are carried out. In the case of $T_d \leq T_{th}$, a control of acceleration mainly using the required throttle opening angle and deceleration based on an engine brake is performed. In step 506, the required throttle opening angle is set. A desired engine torque is calculated from the present transmission gear ratio and the desired torque for speed control $T_d$ and the required throttle opening angle is set from the target engine torque and an engine rotation speed. This is realized utilizing a relationship between the engine rotation speed, the throttle opening angle and the engine torque. To determining the required throttle opening angle in step 506, the method disclosed in the U.S. Pat. No. 5,660,157 may be utilized. Next or in step 507, a required speed change is set. The required speed change is set so that a down shifting is made in the case where the desired torque for speed control $T_d$ requires deceleration based on the engine brake. In step 508, a required brake is set. In the instant case, since there is no need to operate the brake, the required brake is set to release the brake.

On the other hand, in the case where $T_d < T_{th}$, a deceleration control is performed mainly using the brake. Since the deceleration is made controlling the brake, the setting is made so that the throttle turns to full close (step 509). In step 510, a transmission gear ratio is set. In step 511, a required brake is set in accordance with the desired torque for speed control $T_d$. The throttle 211, the transmission 212 and the brake 213 are driven on the basis of the required throttle opening angle, the required speed change and the required brake, respectively, thereby controlling the vehicle speed.

In lieu of the torque control in step 504, the throttle, the transmission and the brake may be controlled directly with the desired speed $V_d$ and the desired speed for correction $\Delta V_d$ being taken as desired values for control.

Figure 6:
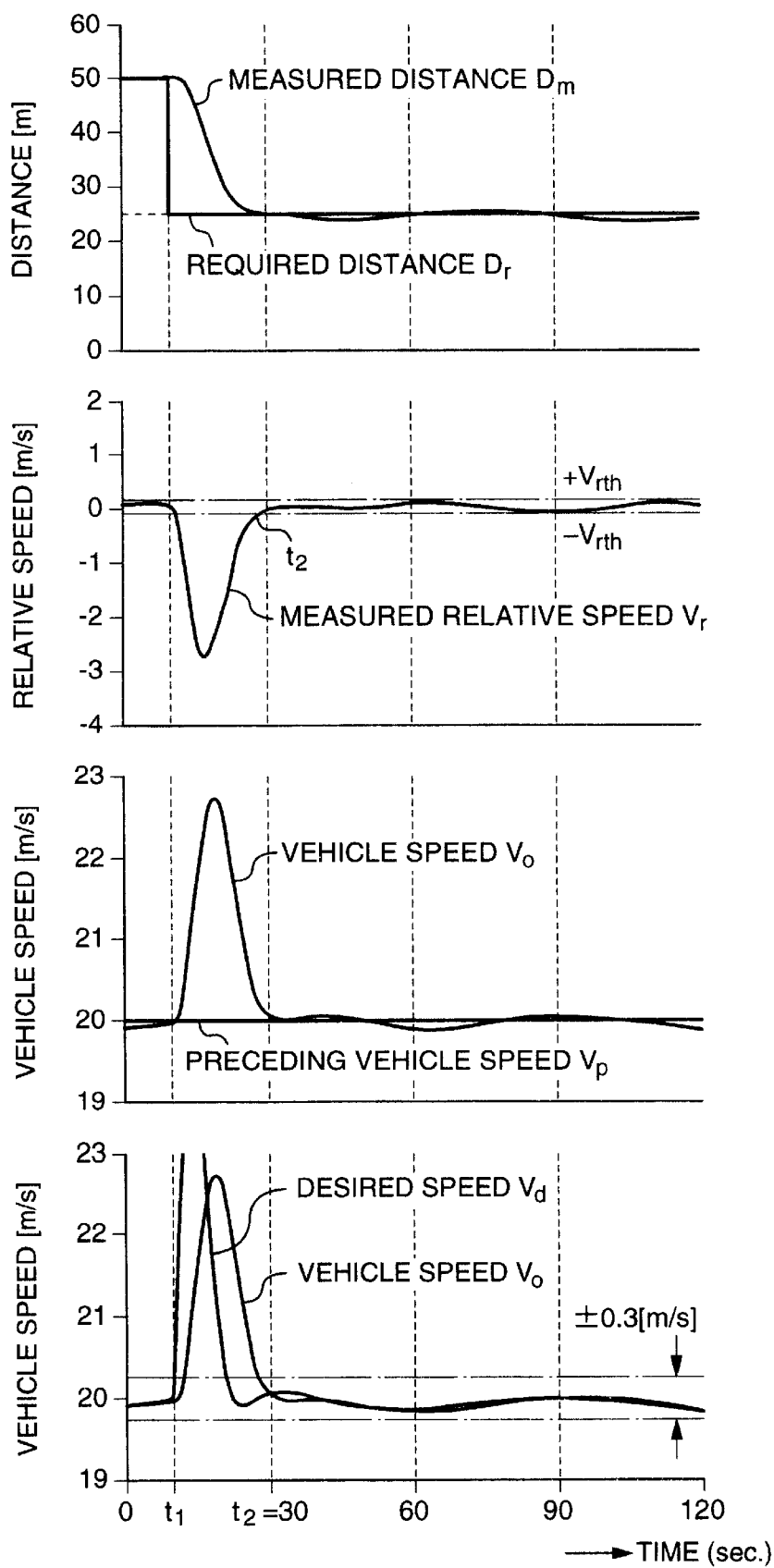
FIG. 6 shows an example of the operation when a desired speed for correction $\Delta V_d$ is set in accordance with equation (4) (n=0) in the processing shown in FIG. 5.

FIG. 6 shows an example of the operation of the running control according to the present embodiment when the desired speed for correction $\Delta V_d$ including a signal having a single frequency (0.05 Hz) in the case of n=0 in equation (4) is used. There are shown the time-dependent changes of the required distance $D_r$, the measured distance $D_m$, the measured relative speed $V_r$, the desired speed $V_d + \Delta V_d$, the speed $V_o$ of the vehicle to be controlled and the speed $V_p$ of the preceding vehicle. At time 0, the required distance $D_r$ is 50 m and the measured distance $D_m$ matches with the required distance $D_r$. If the required distance is changed at time $t_1$ from 50 m to 25 m, the desired speed $V_d$ is increased and the vehicle speed $V_o$ begins to increase (acceleration). In that time, the preceding vehicle continues its running at a constant speed ($V_p$=20 m/s). With a control by which the measured distance $D_m$ is matched with the required distance $D_r$, each of the deviation of the measured distance $D_m$ from the required distance $D_r$ and the measured relative speed $V_r$ becomes small so that the absolute value of the measured relative speed becomes smaller than $V_{rth}$ in due course or at time $t_2$. Starting from time $t_2$, the desired speed for correction $\Delta V_d$ takes a value unequal to zero so that the desired speed $V_d + \Delta V_d$ begins to make a slow oscillation, as shown in FIG. 6. The desired speed $V_d$ turns to a signal having a low frequency and a small amplitude superimposed thereon (for example, 0.05 Hz and $|\Delta V_d|$<0.3 m/s) and the vehicle speed $V_o$ is controlled so that it is matched with the desired speed $V_d + \Delta V_d$. As the vehicle speed $V_o$ changes at a low frequency, each of the measured headway distance $D_m$ and the measured relative speed $V_r$ changes at a low frequency. Thereby, a relative speed exists always and it is therefore possible to detect the preceding vehicle always by the distance detection unit 205.

Figure 7:
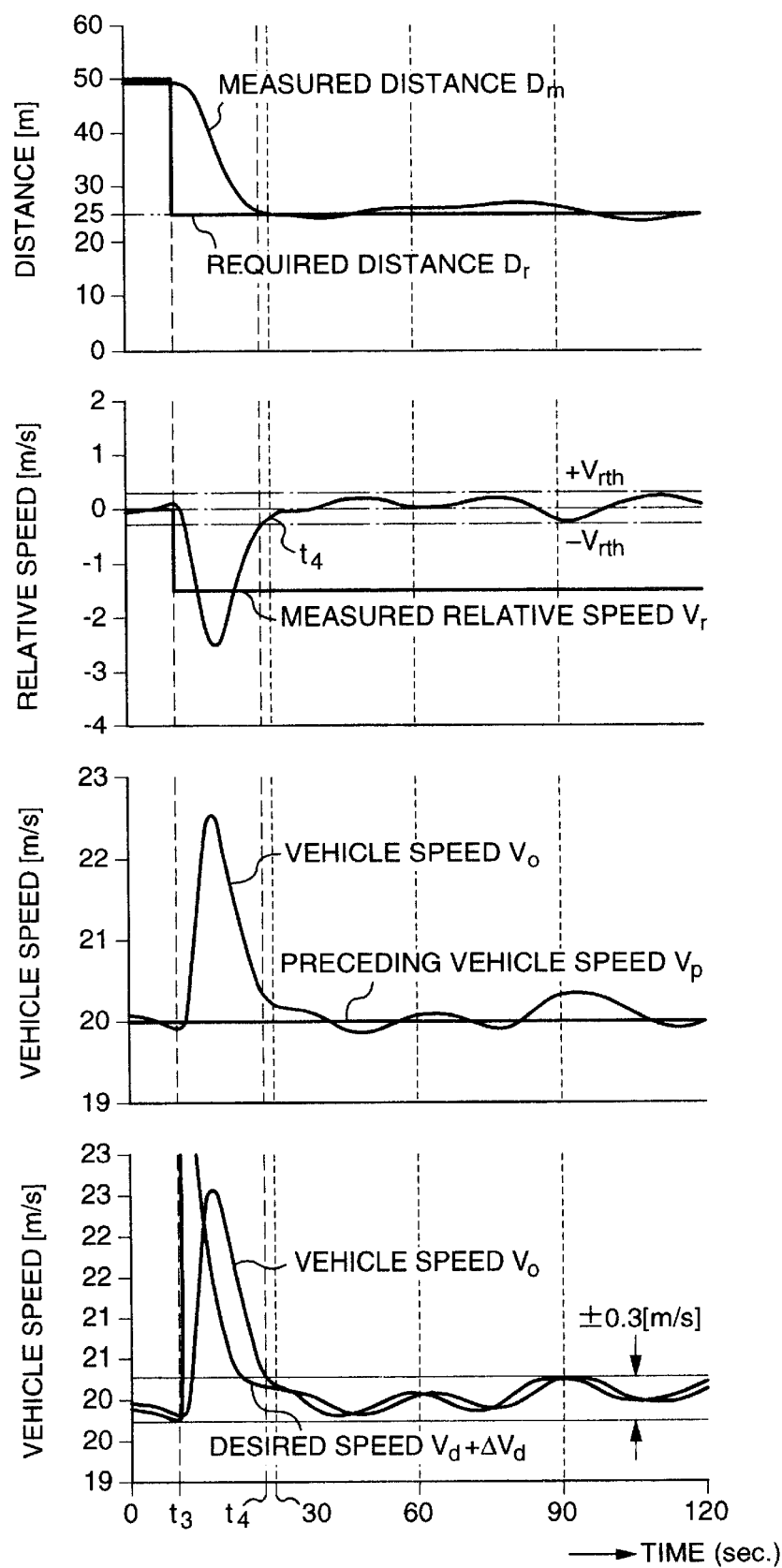
FIG. 7 shows an example of the operation when the desired speed for correction $\Delta V_d$ is set in accordance with equation (4) (n=2) in the processing shown in FIG. 5.

FIG. 7 shows an example of the operation of the running control according to the present embodiment when the desired speed for correction $\Delta V_d$ including a signal having three frequencies (0.02, 0.05 and 0.1 Hz) superimposed in the case of n=2 in equation (4) is used. There are shown the time-dependent changes of the required distance $D_r$, the measured distance $D_m$, the measured relative speed $V_r$, the desired speed $V_d + \Delta V_d$, the speed $V_o$ of the vehicle to be controlled and the speed $V_p$ of the preceding vehicle. At time 0, the required distance $D_r$ is 50 m and $D_m$ matches with $D_r$. When the required distance is changed at time $t_3$ from 50 m to 25 m, the desired speed $V_d$ is increased and the vehicle speed $V_o$ begins to increase (acceleration) so that the measured distance $D_m$ becomes short. In that time, the preceding vehicle continues its running at a constant speed (20 m/s) and the desired speed for correction $\Delta V_d$ is zero. With a control by which the measured distance $D_m$ is matched with the required distance $D_r$, each of the deviation of the measured distance $D_m$ from the required distance $D_r$ and the measured relative speed $V_r$ becomes small so that the absolute value of the measured relative speed $V_r$ becomes smaller than $V_{rth}$ in due course or at time $t_4$. Then, the desired speed for correction $\Delta V_d$ takes a value unequal to zero so that the desired speed $V_d+\Delta V_d$ oscillates, as shown in FIG. 7. With this desired speed, the vehicle speed $V_o$ changes with an amplitude of ±0.3 m/s so that the measured relative speed does not come to zero, thereby making it possible to detect the preceding vehicle always by the distance detection unit 205. Also, a signal having a complicated period as compared with the case of FIG. 6 (n=0) can be used as the desired speed for correction $\Delta V_d$.

Figure 8:
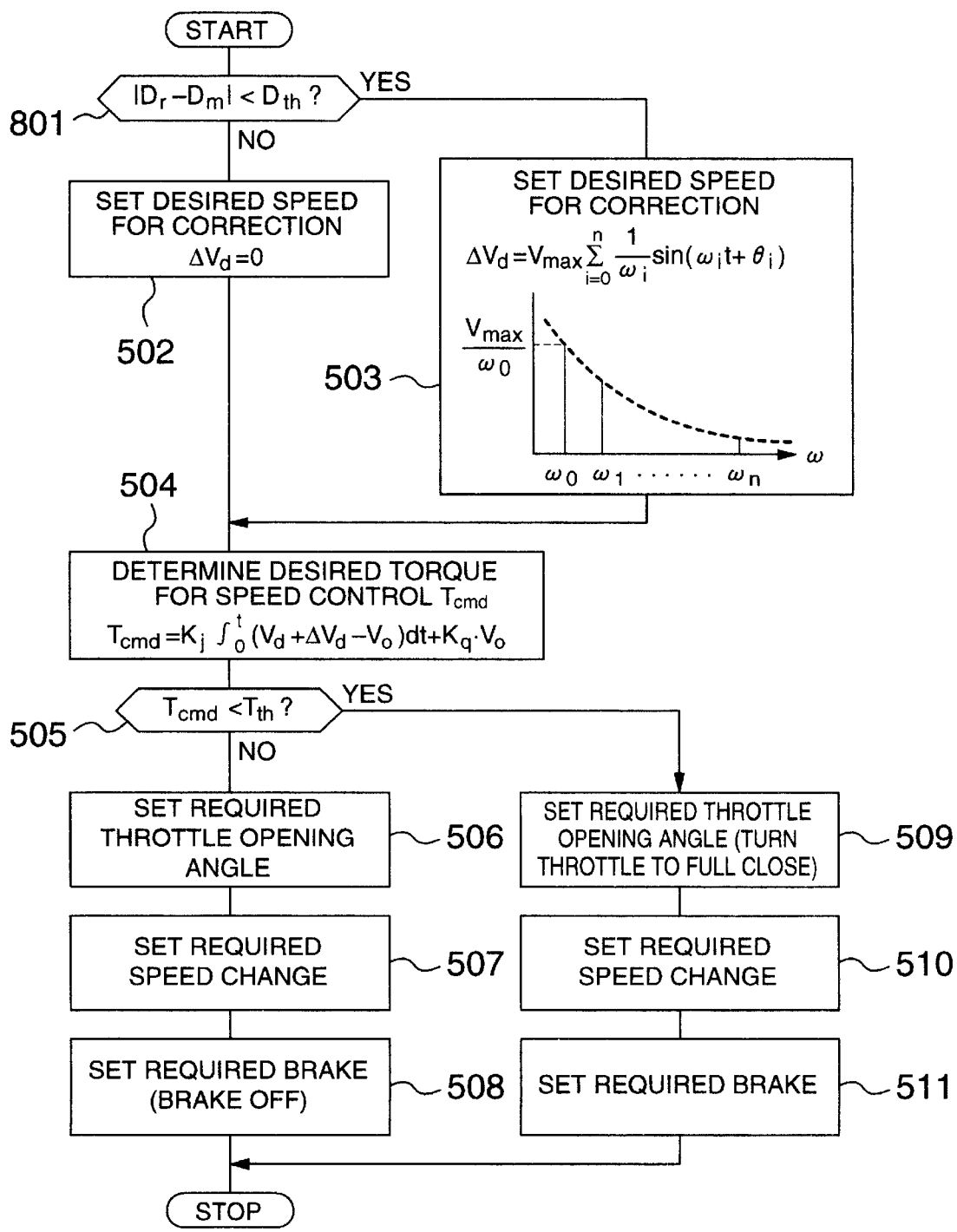
FIG. 8 is a flow chart showing that processing for speed control based on a deviation between a required distance $D_r$ and a measured distance $D_m$ which is performed by the desired speed for correction setting unit and the vehicle speed control unit shown in FIG. 2.

The desired speed for correction setting unit 206 and the vehicle speed control unit 209 can also perform a processing for speed (or headway distance) control in accordance with a flow shown in FIG. 8. The flow shown in FIG. 8 includes the replacement from step 501 of FIG. 5 to step 801 and the other steps are the same as steps 502 to 511 shown in FIG. 5 In step 801, the absolute value of a deviation between the required distance Dr and the measured distance $D_m$ is compared with a preset threshold distance deviation $D_{th}$. In the case where $|D_r-D_m|\geq D_{th}$, a desired speed for correction $\Delta V_d$ is set to zero (step 502). In this case of $|D_r-D_m|\geq D_{th}$, it is meant that there is a difference in speed between the preceding vehicle and the vehicle to be controlled and a difference between the required distance $D_r$ and the measured distance $D_m$ is decreasing or will increase from now on in accordance with the speed control based on equation (3). In any case, it is necessary to make the vehicle speed $V_o$ higher or lower than the speed $V_p$ of the preceding vehicle so that the measured distance $D_m$ is matched with the required distance $D_r$. Therefore, the relative speed does not come to zero even if a speed correction is not performed. Accordingly, it is possible to detect a relationship between the preceding vehicle and the vehicle to be controlled. On the other hand, in the case where $|D_r-D_m|<D_{th}$, a desired speed for correction $\Delta V_d$ is set in step 503 in accordance with equation (4). In this case, a difference between the preceding vehicle and the vehicle to be controlled is small and the measured distance $D_m$ substantially matches with the required distance $D_r$. Accordingly, by continuing the running without make a large change of the vehicle speed $V_o$, the vehicle can run with the required distance $D_r$ kept. It is of course that if the desired speed for correction $\Delta V_d$ is not set, the relative speed $V_r$ comes to zero and therefore the detection of the preceding vehicle by the distance detection unit 205 becomes impossible.

Figure 9:
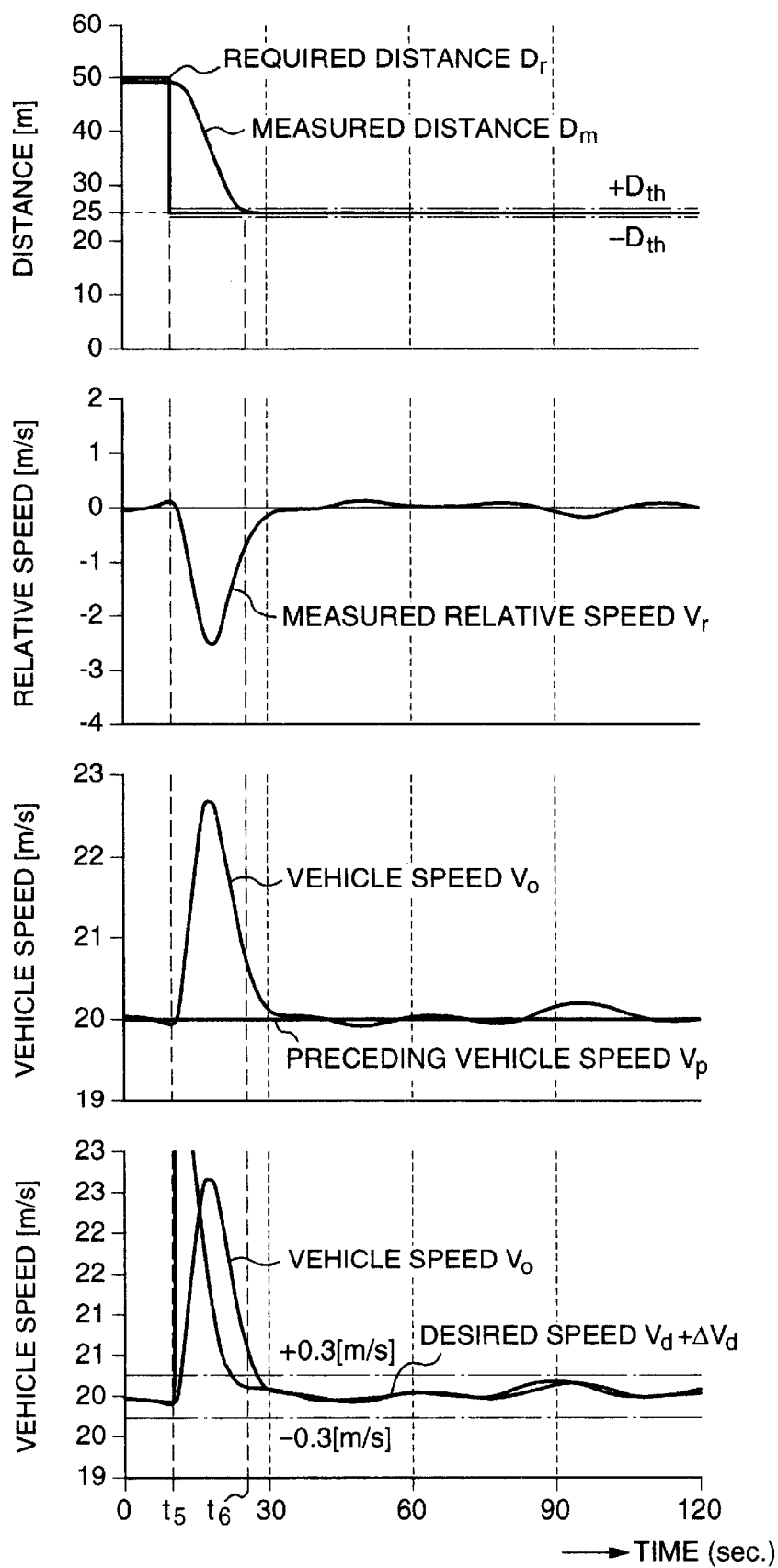
FIG. 9 shows an example of the operation when a desired speed for correction $\Delta V_d$ is set in accordance with equation (4) (n=2) in the processing shown in FIG. 8.

FIG. 9 shows an example of the operation of a control in which the desired speed for correction $\Delta V_d$ including a signal having three frequencies (0.02, 0.05 and 0.1 Hz) superimposed in the case of n=2 in equation (4) is used. There are shown the time-dependent changes of the required distance $D_r$, the measured distance $D_m$, the measured relative speed $V_r$, the desired speed $V_d+\Delta V_d$, the speed $V_o$ of the vehicle to be controlled and the speed $V_p$ of the preceding vehicle. At time 0, the required distance $D_r$ is 50 m and $D_m$ matches with $D_r$. When the required distance is changed at time $t_5$ from 50 m to 25 m, the desired speed $V_d$ is increased and the vehicle speed $V_o$ begins to increase (acceleration). The preceding vehicle continues its running at a constant speed ($V_p$=20 m/s). In that time, the desired speed for correction $\Delta V_d$ is zero. With a speed control by which the measured distance $D_m$ is matched with the required distance $D_r$, each of a deviation between the required distance $D_r$ and the measured distance $D_m$ and the measured relative speed $V_r$ becomes small. When $|D_r-D_m|<D_{th}$ is satisfied in due course or at time $t_6$, the desired speed for correction $\Delta V_d$ takes a value unequal to zero so that the desired speed $V_d+\Delta V_d$ oscillates, as shown in FIG. 9. With this desired speed, the vehicle speed $V_o$ changes within a range of ±0.3 m/s so that the measured relative speed $V_r$ does not come to zero, thereby making it possible to detect the preceding vehicle always by the distance detection unit 205.

Figure 10:
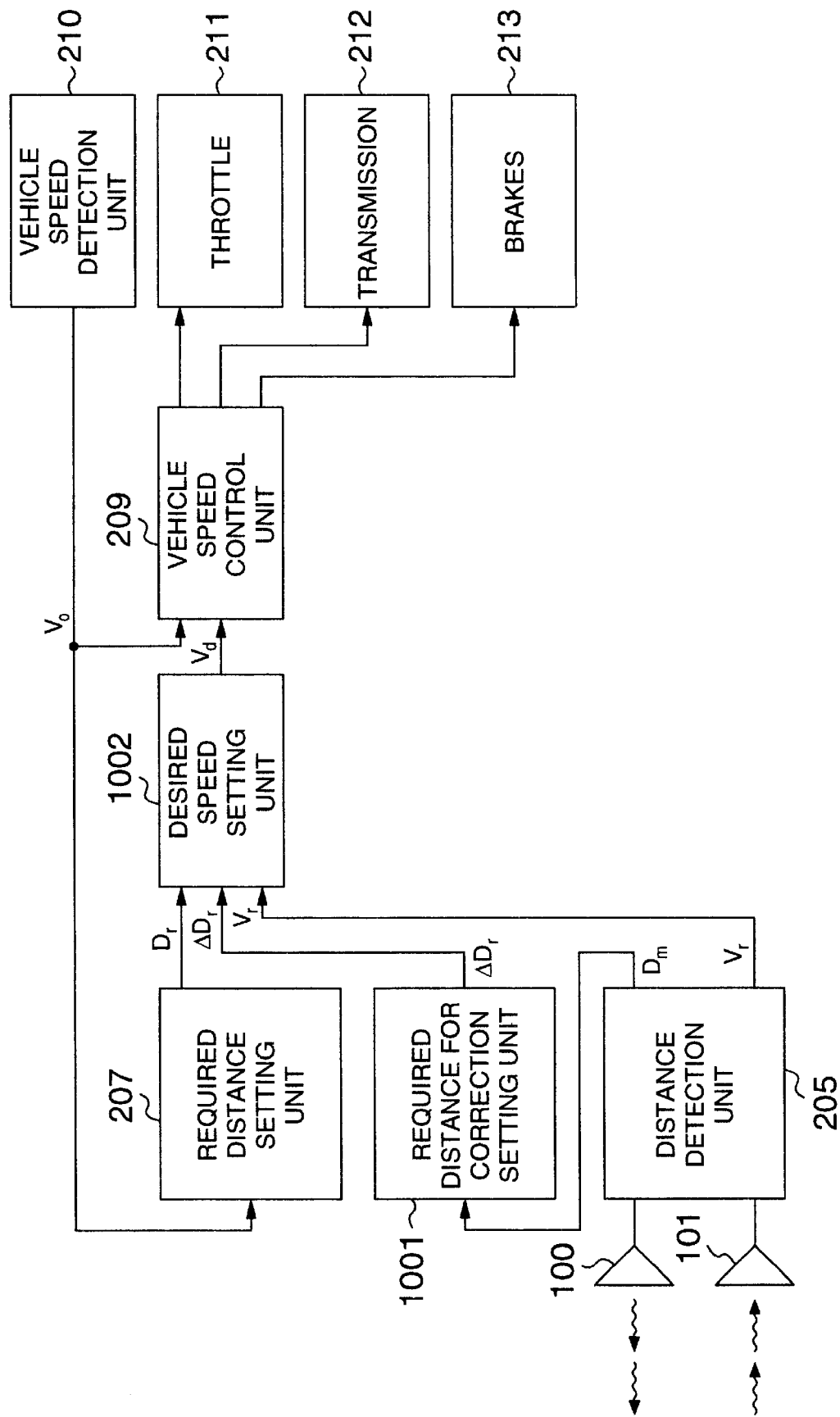
FIG. 10 is a block diagram of a second embodiment of a vehicle running control apparatus according to the present invention.

FIG. 10 is a block diagram of a second embodiment of a vehicle running control apparatus according to the present invention. A distance detection unit 205 detects a measured headway distance $D_m$ and a measured relative speed $V_r$. Also, a required distance setting unit 207 sets a required headway distance $D_r$ on the basis of a vehicle speed $V_o$ detected by a vehicle speed detection unit 210. A required distance for correction setting unit 1001 generates a required distance for correction (or correction target distance) $\Delta D_r$ on the basis of the measured distance $D_m$ and the measured relative speed $V_r$. A desired speed setting unit 1002 sets a desired speed $V_d$ on the basis of the required distance $D_r$, the required distance for correction $\Delta D_r$, the measured distance $D_m$ and the measured relative speed $V_r$. A vehicle speed control unit 209 determines a required throttle opening angle, a required speed change and a required brake from the vehicle speed $V_o$ and the desired speed $V_d$ to drive a throttle 211, a transmission 212 and a brake 213.

Figure 11:
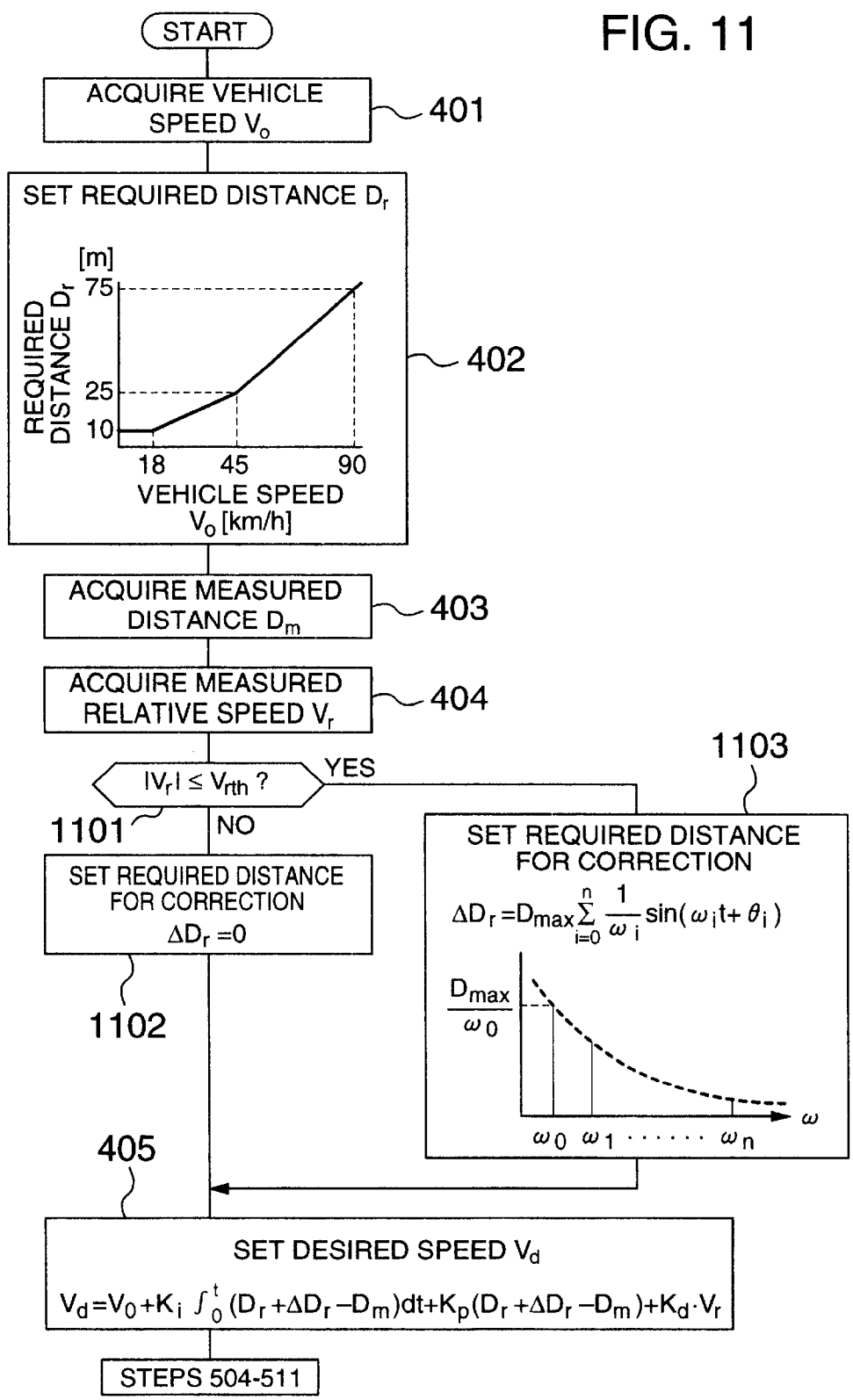
FIG. 11 is a flow chart showing that processing for speed control based on a relative speed which is performed by a required distance setting unit, a required distance for correction setting unit and a desired speed setting unit shown in FIG. 10.

The required distance setting unit 207, the correction target distance setting unit 1001 and the desired speed setting unit 1002 performs a processing for speed control in accordance with a flow shown in FIG. 11. Steps 401 to 404 in the flow shown in FIG. 11 are the same as those in FIG. 4. In step 401, a vehicle speed $V_o$ is taken in from the vehicle speed detection unit 210. In step 402, a required distance $D_r$ corresponding to the vehicle speed $V_o$ is set. In step 403, a measured distance $D_m$ is taken in from the distance detection unit 205. In step 404, a measured relative speed $V_r$ is taken in. The steps to this point are the same as those in the processing flow shown in FIG. 4. In step 1101, the absolute value of the measured relative speed $V_r$ is compared with a preset threshold relative speed $V_{rth}$. In the case where $|V_r|>V_{rth}$, a required distance for connection $\Delta D_r$ is set to zero (step 1102). In this case, it is meant that a difference between the required distance and the measured distance is decreasing or will increase from now on in accordance with the speed control. Accordingly, the relative speed does not come to zero and it is therefore possible to detect a relationship between the preceding vehicle and the vehicle to be controlled. On the other hand, in the case where $|V_r|\leq V_{rth}$, a required distance for correction $\Delta D_r$ is set in step 1103 in accordance with equation (6):

$$\Delta D_r = D_{\max}\sum_{i=0}^{n}\frac{1}{\omega_i}\sin(\omega_i t+\theta_i) \tag{6}$$

where $\omega_i$ is the angular frequency of the required distance for correction and $D_{max}$ is an amplitude when the angular frequency is $\omega_o$. The amplitude is set so that it becomes smaller as each angular frequency $\omega_i$ becomes larger.

In step 405, a desired speed $V_d$ is determined from the required distance $D_r$, the required distance for correction $\Delta D_r$, the measured distance $D_m$ and the measured relative speed $V_r$. Then, the same processings as those in steps 504 to 511 shown in FIG. 5 are performed so that the vehicle speed $V_o$ approximates to the desired speed $V_d$. As a result, the matching is obtained between the required distance $D_r$ and the measured distance $D_m$.

Figure 12:
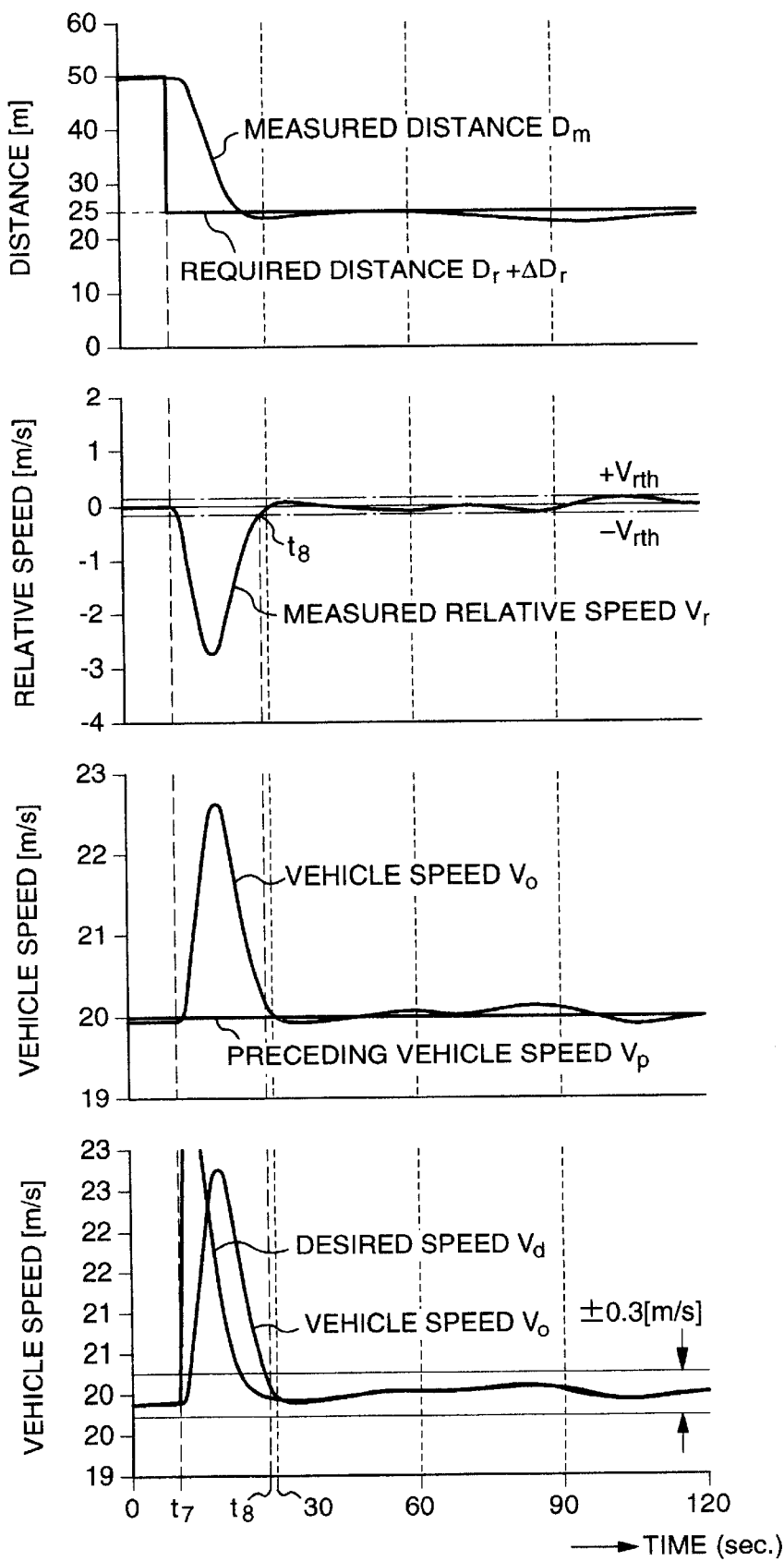
FIG. 12 shows an example of the operation when a required distance for correction $\Delta D_r$ is set in accordance with equation (6) (n=2) in the processing shown in FIG. 11.

FIG. 12 shows an example of the operation when the required distance for correction $\Delta D_r$ including a signal having three frequencies (0.02, 0.05 and 0.1 Hz) superimposed in the case of n=2 in equation (6) is used. There are shown the time-dependent changes of the required distance $D_r$, the measured distance $D_m$, the measured relative distance $V_r$, the desired speed $V_d$, the speed $V_o$ of the vehicle to be controlled and the speed $V_p$ of the preceding vehicle. At time 0, the required distance $D_r$ is 50 m and the measured distance $D_m$ matches with the required distance $D_r$. If the required distance $D_r$ is changed at time $t_7$ from 50 m to 25 m, the desired speed $V_d$ is increased and the vehicle speed $V_o$ begins to increase (acceleration). In that time, the preceding vehicle continues its running at a constant speed (20 m/s) and the required distance for correction $\Delta D_r$ is zero. With a speed control by which the measured distance $D_m$ is matched with the required distance $D_r$, each of a deviation between the required distance $D_r$ and the measured distance $D_m$ and the measured relative speed $V_r$ becomes small so that the absolute value of the measured relative speed $V_r$ becomes smaller than $V_{rth}$ in due course or at time $t_8$. The required distance for correction $\Delta D_r$ is set on the basis of equation (6) and the required distance $D_r + \Delta D_r$ oscillates, as shown in FIG. 12. With this change of the required distance, the vehicle speed $V_o$ changes within an amplitude range of ±0.3 m/s so that the measured relative speed does not come to zero, thereby making it possible to detect the preceding vehicle always by the distance detection unit 205.

Figure 13:
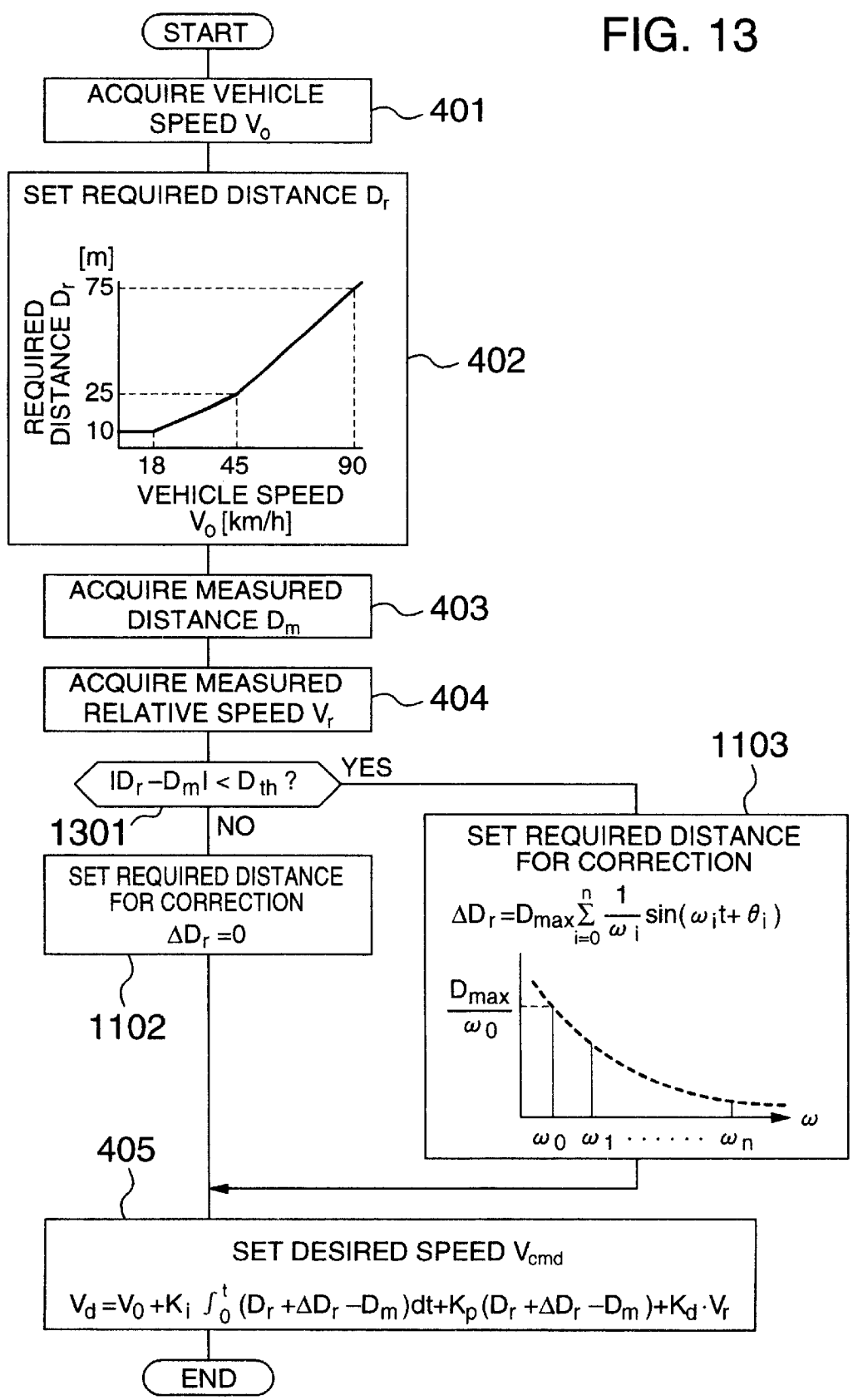
FIG. 13 is a flow chart showing that processing for speed control based on a deviation between a required distance $D_r$ and a measured distance $D_m$ which is performed by the required distance setting unit, the required distance for correction setting unit and the desired speed setting unit shown in FIG. 10.

The required distance setting unit 207, the required distance for correction setting unit 1101 and the desired speed setting unit 1002 can also perform a running control processing in accordance with a flow shown in FIG. 13. The flow shown in FIG. 13 includes the replacement from step 1101 of FIG. 11 to step 1301 and the other steps are the same as steps 401 to 404, 1102, 1103 and 405 shown in FIG. 11. In step 1301, the absolute value $|D_r - D_m|$ of a deviation between the required distance $D_r$ and the measured distance $D_m$ is compared with a preset threshold distance deviation $D_{th}$. In the case where $|D_r - D_m| \geq D_{th}$, a required distance for correction $\Delta D_r$ is set to zero (step 1102). In this case of $|D_r - D_m| \geq D_{th}$, it is meant that a difference between the required distance $D_r$ and the measured distance $D_m$ is decreasing or will increase from now on in accordance with the speed control. In any case, it is necessary to make the vehicle speed $V_o$ higher or lower than the speed $V_p$ of the preceding vehicle so that the measured distance $D_m$ is matched with the required distance $D_r$. In other words, there is a relative speed even if a distance correction is not performed. Accordingly, it is possible to detect a relationship between the preceding vehicle and the vehicle to be controlled. On the other hand, in the case where $|D_r - D_m| < D_{th}$, a required distance for correction $\Delta D_r$ is set in step 1103 in accordance with equation (6). In this case, the measured distance substantially matches with the required distance and a difference in speed between the preceding vehicle and the vehicle to be controlled is small. Accordingly, by causing the vehicle to run without make a large change of the vehicle speed $V_o$, the vehicle can run with the required distance kept. Herein, if the required distance for correction $\Delta D_r$ is not set, the relative speed comes to zero and therefore the detection of the preceding vehicle by the distance detection unit 205 becomes impossible.

Figure 14:
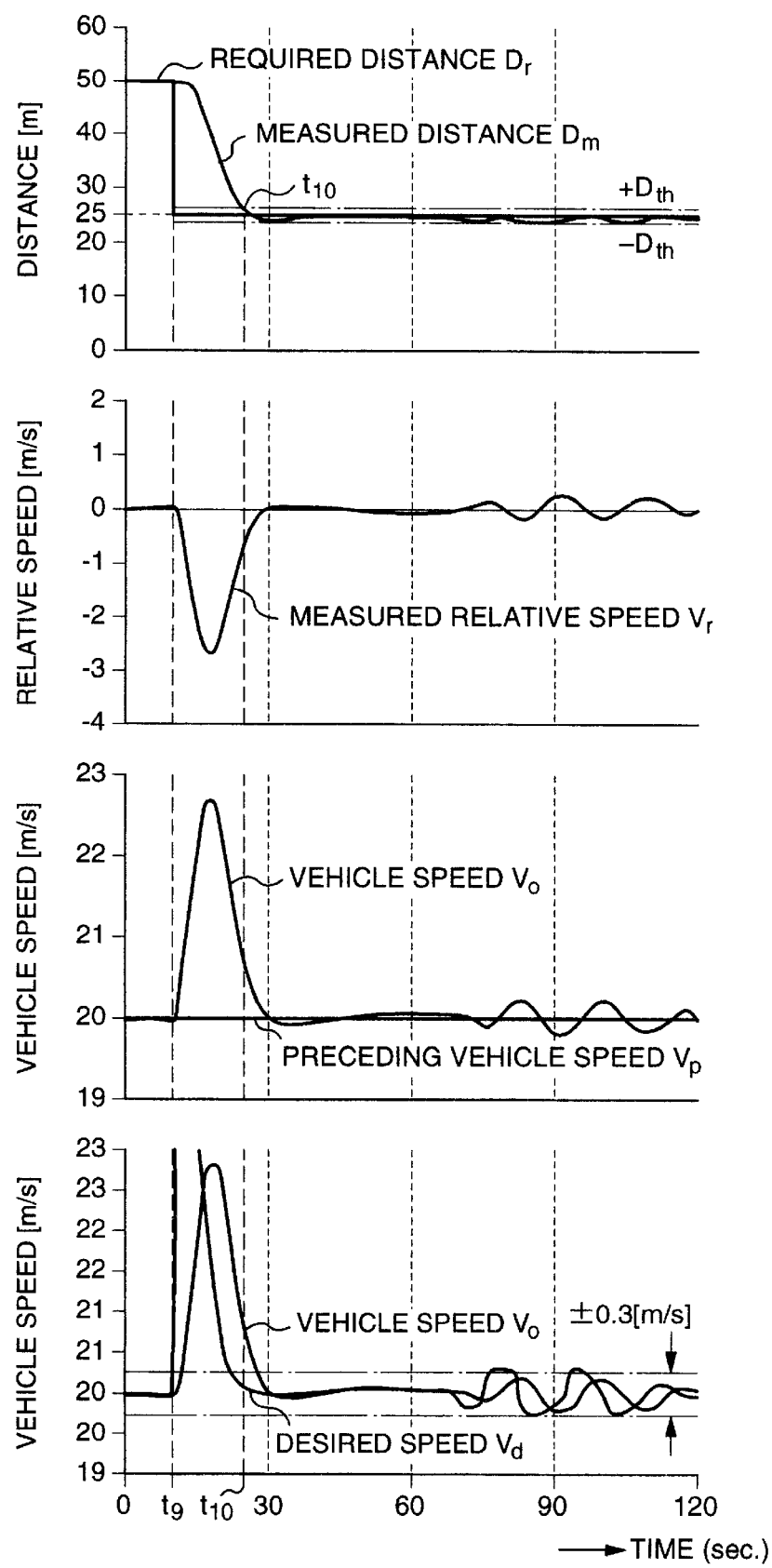
FIG. 14 shows an example of the operation when a required distance for correction $\Delta D_r$ is set in accordance with equation (6) (n=2) in the processing shown in FIG. 13.

FIG. 14 shows an example of the operation when the required distance for correction $\Delta D_r$ including a signal having three frequencies (0.02, 0.05 and 0.1 Hz) superimposed in the case of n=2 in equation (6) is used. There are shown the time-dependent changes of the required distance $D_r$, the measured distance $D_m$, the measured relative speed $V_r$, the desired speed $V_d$, the speed $V_o$ of the vehicle to be controlled and the speed $V_p$ of the preceding vehicle. At time 0, the required distance $D_r$ is 50 m and the measured distance $D_m$ matches with the required distance $D_r$. If the required distance $D_r$ is changed at time $t_9$ from 50 m to 25 m, the desired speed $V_d$ is increased in accordance with the speed control and the vehicle speed $V_o$ begins to increase (acceleration). In that time, the preceding vehicle continues its running at a constant speed ($V_p$=20 m/s) and the required distance for correction $\Delta D_r$ is zero. With a control by which the measured distance $D_m$ is matched with the required distance $D_r$, each of a deviation between the required distance $D_r$ and the measured distance $D_m$ and the measured relative speed $V_r$ becomes small so that the absolute value of the deviation between the required distance $D_r$ and the measured distance $D_m$ becomes smaller than $D_{th}$ in due course or at time $t_{10}$. The required distance for correction $\Delta D_r$ is set on the basis of equation (6) and the required distance $D_r + \Delta D_r$ oscillates, as shown in FIG. 14. With this change of the required distance, the vehicle speed $V_o$ changes within an amplitude range of ±0.3 m/s so that the measured relative speed does not come to zero, thereby making it possible to detect the preceding vehicle always by the distance detection unit 205.

The present invention can be applied to not only a two-frequency CW radar system used in the foregoing embodiments but also a radar system using three or more electromagnetic wave signals having different frequencies and a frequency modulated CW radar system using one electromagnetic wave signal having a continuously changing frequency, thereby making it possible to improve the accuracy of detection of each of a headway distance and a relative speed to a preceding vehicle.

With the use of the present invention, it becomes possible to make the control of a vehicle speed in a headway distance control so that there is a relative speed to a preceding vehicle always. Therefore, it is possible to measure a relation with the preceding vehicle always by use of CW radar. Thereby, it becomes possible to perform the headway distance control continuously. Also, it is possible to provide information of the preceding vehicle always to a driver.

What is claimed is:

1. A vehicle running control apparatus comprising:
   detection means for detecting the change of a difference in frequency between an electromagnetic wave signal transmitted from a vehicle and an electromagnetic wave signal having a Doppler shift reflected from an object and generating information inclusive of a distance between said object and said vehicle and a relative speed of one of said object and said vehicle to the other on the basis of said change in frequency difference;
   desired speed generation means for generating a desired speed on the basis of said information generated by said detection means and information of the running of said vehicle so that said change in frequency difference is generated;
   speed control means for generating a signal for control of the speed of said vehicle on the basis of said desired speed;
   wherein said desired speed generation means sets said desired speed so that the detected relative speed takes a value in a predetermined range unequal to zero; and wherein said desired speed generation means includes means for setting a time-dependent changing desired speed when the detected relative speed comes to the value in the predetermined range unequal to zero.

2. A vehicle running control apparatus according to claim 1, wherein said time-dependent changing desired speed includes one or more sine signals.

3. A vehicle running control apparatus according to claim 1, wherein said speed control means determines said desired speed on the basis of the speed of said vehicle, the detected relative speed and a difference between a required distance and the detected distance between said object and said vehicle.

4. A vehicle running control apparatus according to claim 1, further comprising means for determining a desired driving torque value for said vehicle corresponding to said desired speed.

5. A vehicle running control apparatus according to claim 4, further comprising means for performing the control of a throttle opening angle, a transmission and a brake of an engine mounted on said vehicle in accordance with said desired driving torque value.

6. A vehicle running control apparatus comprising:

detection means for detecting the change of a difference in frequency between an electromagnetic wave signal transmitted from a vehicle and an electromagnetic wave signal having a Doppler shift reflected from an object and generating information inclusive of a distance between said object and said vehicle and a relative speed of one of said object and said vehicle to the other on the basis of said change in frequency difference;

desired speed generation means for generating a desired speed on the basis of said information generated by said detection means and information of the running of said vehicle so that said change in frequency difference is generated;

speed control means for generating a signal for control of the speed of said vehicle on the basis of said desired speed;

wherein said desired speed generation means sets said desired speed so that the detected relative speed takes a value in a predetermined range unequal to zero; and wherein said desired speed generation means includes means for setting a time-dependent changing desired speed when a difference between said distance between said object and said vehicle and a predetermined required distance becomes smaller than a reference value.

7. A vehicle running control apparatus according to claim 6, wherein said time-dependent changing desired speed includes one or more sine signals.

8. A vehicle running control apparatus comprising:

detection means for detecting the change of a difference in frequency between an electromagnetic wave signal transmitted from a vehicle and an electromagnetic wave signal having a Doppler shift reflected from an object and generating information inclusive of a distance between said object and said vehicle and a relative speed of one of said object and said vehicle to the other on the basis of said change in frequency difference;

desired speed generation means for generating a desired speed on the basis of said information generated by said detection means and information of the running of said vehicle so that said change in frequency difference is generated;

speed control means for generating a signal for control of the speed of said vehicle on the basis of said desired speed; and further comprising means for setting a required distance between said object and said vehicle from at least the speed of said vehicle, said desired speed generation means including means for setting a first desired speed and a desired speed for correction on the basis of the speed of said vehicle, the detected relative speed, said required distance and the detected distance between said object and said vehicle, and said speed control means controlling the speed of said vehicle on the basis of said first desired speed when the absolute value of said detected relative speed is larger than a reference value and on the basis of the sum of said first desired speed and said desired speed for correction when the absolute value of said detected relative speed is not larger than said reference value.

9. A vehicle running control apparatus according to claim 8, wherein said desired speed for correction includes a time-dependent changing desired speed signal.

10. A vehicle running control apparatus according to claim 9, wherein said time-dependent changing desired speed signal includes one or more sine signals.

11. A vehicle running control apparatus according to claim 10, wherein said desired speed for correction is represented by the equation of $$\Delta V_d = V_{max} \sum_{i=0}^{n} \{(1/\omega_i)\sin(\omega_i t + \theta_i)\}$$

where $\Delta V_d$ is the desired speed for correction, $V_{max}$ is the maximum speed for correction, $\omega_i$ is the angular frequency, t is a time from the setting of the desired speed for correction, $\theta_i$ is an initial phase difference, and n is any integer equal to or larger than 0.

12. A vehicle running control apparatus comprising:

detection means for detecting the change of a difference in frequency between an electromagnetic wave signal transmitted from a vehicle and an electromagnetic wave signal having a Doppler shift reflected from an object and generating information inclusive of a distance between said object and said vehicle and a relative speed of one of said object and said vehicle to the other on the basis of said change in frequency difference;

desired speed generation means for generating a desired speed on the basis of said information generated by said detection means and information of the running of said vehicle so that said change in frequency difference is generated;

speed control means for generating a signal for control of the speed of said vehicle on the basis of said desired speed; and further comprising means for setting a required distance between said object and said vehicle from at least the speed of said vehicle, said desired speed generation means including means for setting a first desired speed and a desired speed for correction on the basis of the speed of said vehicle, the detected relative speed, said required distance and the detected distance between said object and said vehicle, and said speed control means controlling the speed of said vehicle on the basis of said first desired speed when the absolute value of a difference between said detected distance and said required distance is larger than a reference value on the basis of the sum of said first desired speed and said desired speed for correction when the absolute value of said difference is not larger than said reference value.

13. A vehicle running control apparatus according to claim 12, wherein said desired speed for correction includes a time-dependent changing desired speed signal.

14. A vehicle running control apparatus according to claim 13, wherein said time-dependent changing desired speed signal includes one or more sine signals.

15. A vehicle running control apparatus according to claim 14, wherein said desired speed for correction is represented by the equation of $$\Delta V_d = V_{\max} \sum_{i=0}^{n} \{(1/\omega_i)\sin(\omega_i t + \theta_i)\}$$

where $\Delta V_d$ is the desired speed for correction, $V_{max}$ is the maximum speed for correction, $\omega_i$ is the angular frequency, t is a time from the setting of the desired speed for correction, $\theta_i$ is an initial phase difference, and n is any integer equal to or larger than 0.

16. A vehicle running control apparatus comprising:
   detection means for detecting the change of a difference in frequency between an electromagnetic wave signal transmitted from a vehicle and an electromagnetic wave signal having a Doppler shift reflected from an object and generating information inclusive of a distance between said object and said vehicle and a relative speed of one of said object and said vehicle to the other on the basis of said change in frequency difference;
   desired speed generation means for generating a desired speed on the basis of said information generated by said detection means and information of the running of said vehicle so that said change in frequency difference is generated;
   speed control means for generating a signal for control of the speed of said vehicle on the basis of said desired speed; and
   further comprising means for setting a required distance between said object and said vehicle from at least the speed of said vehicle and means for setting a required distance for correction, said desired speed generation means including means for setting said desired speed on the basis of the speed of said vehicle, the detected relative speed, and a deviation between said required distance and the detected distance between said object and said vehicle so that when the absolute value of said detected relative speed is not larger than a reference value, said desired speed is set taking as said deviation a difference between the sum of said required distance and said required distance for correction and said detected distance.

17. A vehicle running control apparatus according to claim 16, wherein said required distance for correction includes a time-dependent changing required distance signal.

18. A vehicle running control apparatus according to claim 17, wherein said time-dependent changing required distance signal includes one or more sine signals.

19. A vehicle running control apparatus according to claim 18, wherein said required distance for correction is represented by the equation of $$\Delta D_r = D_{\max} \sum_{i=0}^{n} \{(1/\omega_i)\sin(\omega_i t + \theta_i)\}$$

where $\Delta D_r$ is the required distance for correction, $D_{max}$ is the maximum distance for correction, $\omega_i$ is the angular frequency, t is a time from the setting of the required distance for correction, $\theta_i$ is an initial phase difference, and n is any integer equal to or larger than 0.

20. A vehicle running control apparatus comprising:
   detection means for detecting the change of a difference in frequency between an electromagnetic wave signal transmitted from a vehicle and an electromagnetic wave signal having a Doppler shift reflected from an object and generating information inclusive of a distance between said object and said vehicle and a relative speed of one of said object and said vehicle to the other on the basis of said change in frequency difference;
   desired speed generation means for generating a desired speed on the basis of said information generated by said detection means and information of the running of said vehicle so that said change in frequency difference is generated;
   speed control means for generating a signal for control of the speed of said vehicle on the basis of said desired speed; and
   further comprising means for setting a required distance between said object and said vehicle from at least the speed of said vehicle and means for setting a required distance for correction, said desired speed generation means including means for setting said desired speed on the basis of the speed of said vehicle, the detected relative speed, and a deviation between said required distance and the detected distance between said object and said vehicle so that when the absolute value of said deviation is not larger than a reference value, said desired speed is set taking as said deviation a difference between the sum of said required distance and said required distance for correction and said detected distance.

21. A vehicle running control apparatus according to claim 20, wherein said required distance for correction includes a time-dependent changing required distance signal.

22. A vehicle running control apparatus according to claim 21, wherein said time-dependent changing required distance signal includes one or more sine signals.

23. A vehicle running control apparatus according to claim 22, wherein said required distance for correction is represented by the equation of $$\Delta D_r = D_{\max} \sum_{i=0}^{n} \{(1/\omega_i)\sin(\omega_i t + \theta_i)\}$$

where $\Delta D_r$ is the required distance for correction, $D_{max}$ is the maximum distance for correction, $\omega_i$ is the angular frequency, t is a time from the setting of the required distance for correction, $\theta_i$ is an initial phase difference, and n is any integer equal to or larger than 0.

24. A vehicle running control method comprising:
   detecting the change of a difference in frequency between an electromagnetic wave signal transmitted from a vehicle and an electromagnetic wave signal having a Doppler shift reflected from an object;

generating speed/distance information inclusive of a distance between said object and said vehicle and a relative speed of one of said object and said vehicle to the other on the basis of said change in frequency difference;

generating a desired speed on the basis of said speed/distance information and information of said vehicle so that said change in frequency difference is generated;

generating a signal for control of the speed of said vehicle on the basis of said desired speed;

wherein said desired speed is generated so that the detected relative speed takes a value in a predetermined range unequal to zero; and wherein a time-dependent changing desired speed is set when the detected relative speed comes to the value in the predetermined range unequal to zero.

25. A vehicle running control method comprising:

detecting the change of a difference in frequency between an electromagnetic wave signal transmitted from a vehicle and an electromagnetic wave signal having a Doppler shift reflected from an object;

generating speed/distance information inclusive of a distance between said object and said vehicle and a relative speed of one of said object and said vehicle to the other on the basis of said change in frequency difference;

generating a desired speed on the basis of said speed/distance information and information of said vehicle so that said change in frequency difference is generated;

generating a signal for control of the speed of said vehicle on the basis of said desired speed;

wherein said desired speed is generated so that the detected relative speed takes a value in a predetermined range unequal to zero; and wherein a time-dependent changing desired speed is set when a difference between said distance between said object and said vehicle and a predetermined required distance becomes smaller than a reference value.

26. A computer program product comprising a computer usable medium having computer readable program code means embodied in said medium for controlling the running of a vehicle, said computer readable program code means comprising:

means for detecting the change of a difference in frequency between an electromagnetic wave signal transmitted from a vehicle and an electromagnetic wave signal having a Doppler shift reflected from an object;

means for generating speed/distance information inclusive of a distance between said object and said vehicle and a relative speed of one of said object and said vehicle to the other on the basis of said change in frequency difference;

means for generating a desired speed on the basis of said speed/distance information and information of said vehicle so that said change in frequency difference is generated;

means for generating a signal for control of the speed of said vehicle on the basis of said desired speed;

wherein said desired speed generating means includes means for determining said desired speed so that the detected relative speed takes a value in a predetermined range unequal to zero; and wherein said desired speed generating means includes means for generating a time-dependent changing desired speed signal when the detected relative speed comes to the value in the predetermined range unequal to zero.

27. A computer program product comprising a computer usable medium having computer readable program code means embodied in said medium for controlling the running a vehicle, said computer readable program code means comprising:

means for detection the change of a difference in frequency between an electromagnetic wave signal transmitted from a vehicle and an electromagnetic wave signal having a Doppler shift reflected from an object;

means for generating speed/distance information inclusive of a distance between said object and said vehicle and a relative speed of one of said object and said vehicle to the other on the basis of said change in frequency difference;

means for generating a desired speed on the basis of said speed/distance information and information of said vehicle so that said change in frequency difference is generated;

means for generating a signal for control of the speed of said vehicle on the basis of said desired speed;

wherein said desired speed generating means includes means for determining said desired speed so that the detected relative speed takes a value in a predetermined range unequal to zero; and wherein said desired speed generating means includes means for generating a time-dependent changing desired speed signal when a difference between said distance between said object and said vehicle and a predetermined required distance becomes smaller than a reference value.

* * * * *